(12) United States Patent
Abe

(10) Patent No.: US 10,107,640 B2
(45) Date of Patent: Oct. 23, 2018

(54) VEHICULAR TRAVEL CONDITION MONITORING APPARATUS

(71) Applicant: BRIDGESTONE CORPORATION, Tokyo (JP)

(72) Inventor: Tomohiko Abe, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 175 days.

(21) Appl. No.: 15/121,811

(22) PCT Filed: Aug. 7, 2014

(86) PCT No.: PCT/JP2014/070887
§ 371 (c)(1),
(2) Date: Aug. 26, 2016

(87) PCT Pub. No.: WO2015/129072
PCT Pub. Date: Sep. 3, 2015

(65) Prior Publication Data
US 2017/0010122 A1    Jan. 12, 2017

(30) Foreign Application Priority Data
Feb. 28, 2014  (JP) .................. 2014-038248

(51) Int. Cl.
*G01C 21/36* (2006.01)
*G07C 5/08* (2006.01)
(Continued)

(52) U.S. Cl.
CPC .......... *G01C 21/3647* (2013.01); *G06T 15/02* (2013.01); *G07C 5/0866* (2013.01);
(Continued)

(58) Field of Classification Search
CPC .... G01C 21/3647; G06T 15/02; G07C 5/0866
(Continued)

(56) References Cited

U.S. PATENT DOCUMENTS 5,446,659 A  *  8/1995  Yamawaki ............. G01P 1/127
                                                        340/438
6,553,308 B1     4/2003  Uhlmann et al.
(Continued)

FOREIGN PATENT DOCUMENTS

CN    201937689 U    8/2011
CN    102592329 A    7/2012
(Continued)

OTHER PUBLICATIONS

International Preliminary Report on Patentability issued from the International Bureau in counterpart International application No. PCT/JP2014/070887, dated Sep. 15, 2016.
(Continued)

*Primary Examiner* — Isaac G Smith
(74) *Attorney, Agent, or Firm* — Sughrue Mion, PLLC

(57) ABSTRACT

To provide a vehicular travel state monitoring device has functions of displaying images ahead of a traveling vehicle and data measured of a traveling state of the vehicle, such as accelerations acting on the vehicle, as images on the same screen and storing the displayed images as moving image data, a mobile terminal device has a vehicular travel state measuring means (13) built therein which includes a GPS (131), a three-axis acceleration sensor (132) and a three-axis angular velocity sensor (133). The mobile terminal device is further provided with a synthetic image generating means (16) which generates a synthetic image of a plurality of data synthesized at predetermined time intervals, out of measurement data measured by the vehicular travel state measuring means (13), imaging data captured by an imaging means (12), and Web information data acquired by a Web information acquiring unit (11*a*). The synthetic image is displayed on a display screen (17G) as a moving image, and data of the moving image are stored in a storage means (19) as travel record data of the vehicle.

6 Claims, 6 Drawing Sheets

(51) Int. Cl.
*G08G 1/01* (2006.01)
*G08G 1/0967* (2006.01)
*G06T 15/02* (2011.01)
*G07C 5/00* (2006.01)

(52) U.S. Cl.
CPC ......... *G08G 1/0112* (2013.01); *G08G 1/0133* (2013.01); *G08G 1/096716* (2013.01); *G08G 1/096758* (2013.01); *G08G 1/096775* (2013.01); *G06T 2207/30252* (2013.01); *G07C 5/008* (2013.01)

(58) Field of Classification Search
USPC .............................................. 701/436, 32.2
See application file for complete search history.

(56) References Cited

U.S. PATENT DOCUMENTS

| | | | | |
|---|---|---|---|---|
| 8,260,489 | B2* | 9/2012 | Nielsen | G07C 5/085 701/32.2 |
| 2006/0158330 | A1 | 7/2006 | Gueziec | |
| 2010/0201819 | A1 | 8/2010 | Minowa | |
| 2013/0096828 | A1 | 4/2013 | Fujimoto et al. | |
| 2013/0302758 | A1* | 11/2013 | Wright | G07C 5/008 434/65 |
| 2013/0335237 | A1 | 12/2013 | Zarka et al. | |

FOREIGN PATENT DOCUMENTS

| | | |
|---|---|---|
| CN | 202650093 U | 1/2013 |
| CN | 103310501 A | 9/2013 |
| JP | 2010-224906 A | 10/2010 |
| JP | 2011-155552 A | 8/2011 |
| JP | 2011-239001 A | 11/2011 |
| JP | 2013-140485 A | 7/2013 |
| WO | WO-2013073310 A1 * | 5/2013 ............ B60W 50/06 |

OTHER PUBLICATIONS

Communication dated May 26, 2017, from the State Intellectual Property Office of the P.R.C., in counterpart Chinese application No. 201480076292.5.
International Search Report for PCT/JP2014/070887 dated Oct. 14, 2014.
Communication dated Feb. 17, 2017, from the European Patent Office in counterpart European Application No. 14884103.4.

* cited by examiner

VEHICULAR TRAVEL CONDITION MONITORING APPARATUS

CROSS REFERENCE TO RELATED APPLICATIONS

This application is a National Stage of International Application No. PCT/JP2014/070887 filed Aug. 7, 2014, claiming priority based on Japanese Patent Application No. 2014-038248 filed Feb. 28, 2014, the contents of all of which are incorporated herein by reference in their entirety.

BACKGROUND OF THE INVENTION

1. Field of the Invention

The present invention relates to a vehicular travel state monitoring device for measuring and displaying a traveling state of a vehicle.

2. Description of the Related Art

The measurement of vehicular travel data has conventionally been made by way of connecting various sensors wiredly or wirelessly to a data logger, such as a hard disk, and storing the measured data. And the measured data thus stored are transferred to a server equipment of a vehicle controller or a vehicle service provider by wireless LAN, for instance (see Patent Document 1, for instance).

CONVENTIONAL ART DOCUMENT

Patent Document

Patent Document 1: Japanese Unexamined Patent Application No. 2013-182421

SUMMARY OF THE INVENTION

Problem to be Solved by the Invention

However, the conventional measurement of vehicular travel data requires not only the connection of the various sensors with a data logger wiredly or wirelessly, but also the addition of data transmission function. This has led to a problem of large equipment in size.

Also, the vehicle information storage unit as disclosed in Patent Document 1 has the function of storing vehicular travel data, such as engine speed and accelerations, and a vehicle traveling locus on a road map. But it does not store information as to on which road surface conditions, vehicular accelerations and vehicular attitude angles were changed. Therefore, this poses another problem of not being able to fully grasp the traveling state of the vehicle.

The present invention has been made in view of the foregoing problems, and an object of the invention is to provide a vehicular travel state monitoring device having functions of displaying images ahead of a traveling vehicle and the data measured of the traveling state of the vehicle, such as accelerations acting on the vehicle, as images on the same screen and storing the displayed images as moving image data.

Means for Solving the Problem

The present invention provides a vehicular travel state monitoring device mounted on a vehicle to monitor a traveling state of the vehicle. The device includes a Web information acquiring means for acquiring Web information via an external network, an imaging means for capturing images of outside or inside of the vehicle, a vehicular travel state measuring means including a GPS, a three-axis acceleration sensor, and a three-axis angular velocity sensor, a synthetic image generating means for generating a synthetic image by synthesizing a plurality of data at predetermined time intervals, out of measurement data measured by the vehicular travel state measuring means, imaging data captured by the imaging means, and Web information data acquired by the Web information acquiring means, a display means for displaying the synthetic image synthesized by the synthetic image generating means as a moving image, and a storage means for storing data of the moving image as travel record data of the vehicle.

As a result, the image data of images ahead of a traveling vehicle, Web information, such as weather data and map information data, and data measured of the traveling state of the vehicle, such as accelerations acting on the vehicle, can be displayed as images on the same screen. And, at the same time, the displayed images can be stored as travel record data (moving image data). Hence, it is possible to fully grasp the traveling state of the vehicle and the road surface condition at a given moment of time.

It is to be noted that the foregoing summary of the invention does not necessarily recite all the features essential to the invention. Therefore, it should be understood that the subcombinations of these features also fall within the scope of the invention.

MODE FOR CARRYING OUT THE INVENTION

Hereinbelow, a description is given of the embodiments of the present invention with reference to the accompanying drawings.

Figure 1:
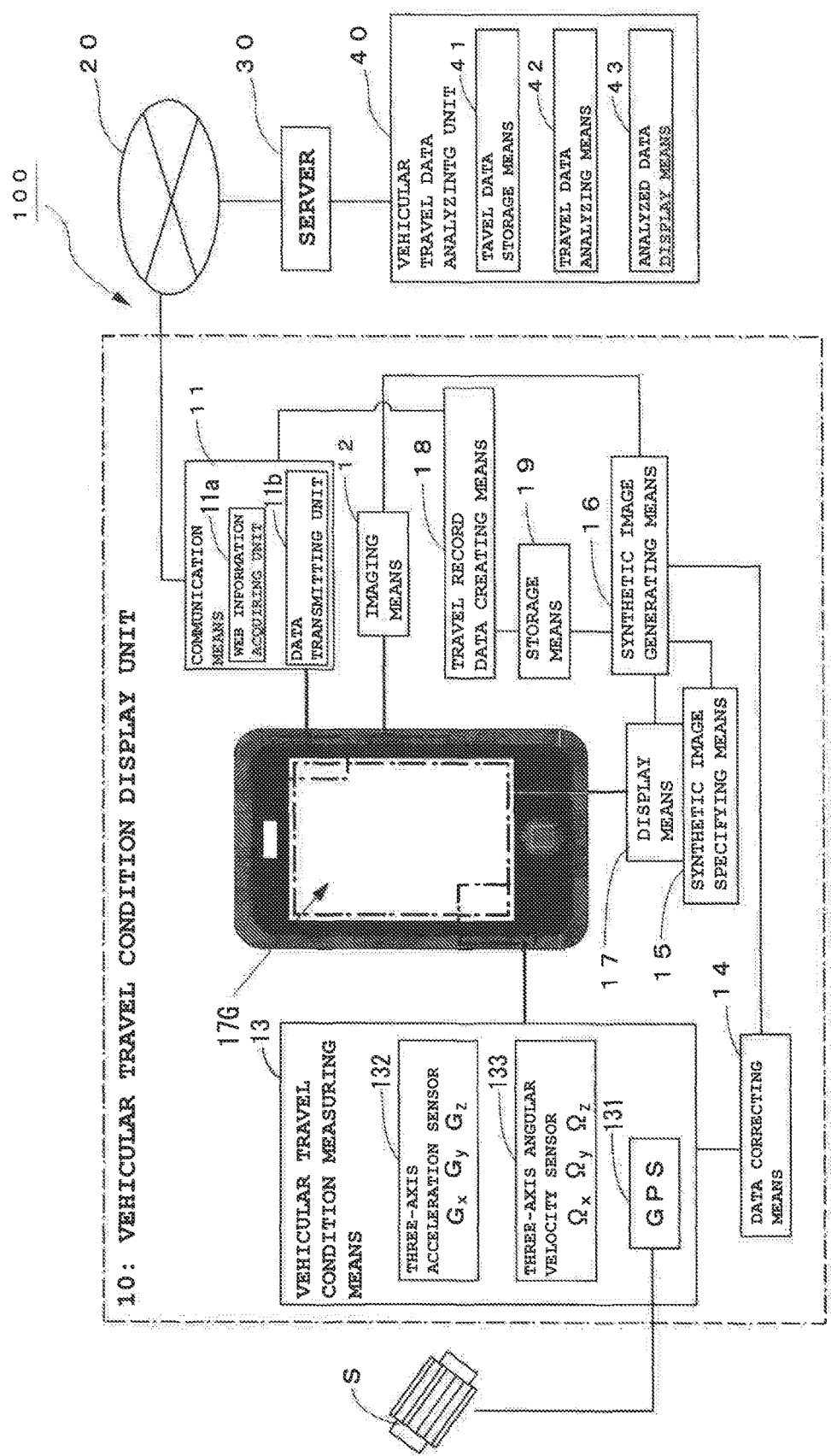
FIG. 1 is a functional block diagram showing a schema of a vehicular travel state monitoring system according to an embodiment of the invention.

FIG. 1 is a functional block diagram showing a schema of a vehicular travel state monitoring system 100 according to an embodiment. The vehicular travel state monitoring system 100 includes a vehicular travel state monitoring device 10 mounted on a vehicle and a vehicular travel data analyzing unit 40 connected to the vehicular travel state monitoring device 10 via the Internet 20 which is an external network and a server 30.

The vehicular travel state monitoring device 10 includes a communication means 11, an imaging means 12, a vehicular travel state measuring means 13, a data correcting means 14, a synthetic image specifying means 15, a synthetic image generating means 16, a display means 17, a travel record data creating means 18, and a storage means 19.

The communication means 11 includes a Web information acquiring unit 11a for accessing the Internet 20 and acquiring Web information, such as weather data and map information data, from a server 30 and a data transmitting unit 11b for transmitting travel record data to be discussed later to the vehicular travel data analyzing unit 40. It is to be noted that the server 30 may have the function of the vehicular travel data analyzing unit 40.

The imaging means 12 is installed in the vehicle interior and captures images of outside or inside of the vehicle, and the data captured is stored as image data in the storage means 19.

The vehicular travel state measuring means 13 includes a GPS 131, a three-axis acceleration sensor 132, and a three-axis angular velocity sensor 133.

The GPS 131 acquires the position data (latitude, longitude, altitude) of the vehicle carrying the vehicular travel state monitoring device 10 and calculates the vehicle speed V from the position data of the vehicle, based on radio waves transmitted from a satellite S. It is to be noted that the position data of the vehicle may be the latitude and longitude only.

Figure 2:
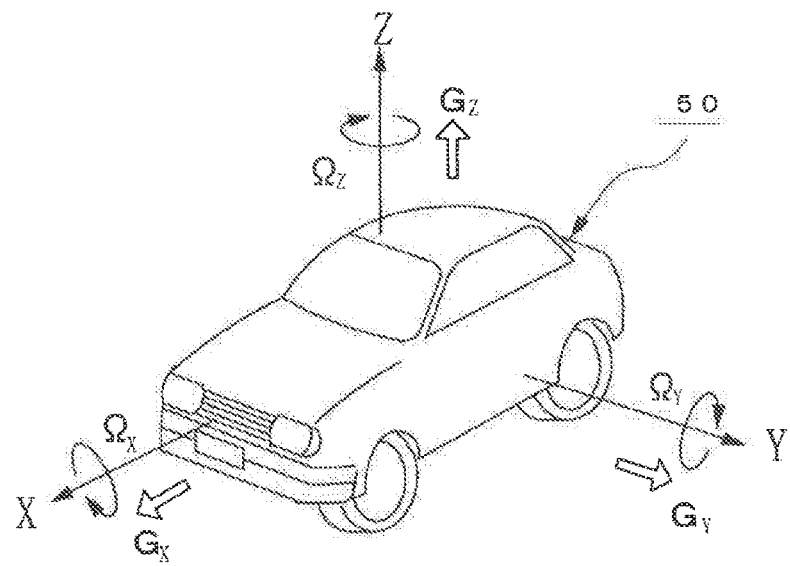
FIG. 2 is an illustration for explaining the vehicular accelerations and vehicular angular velocities.
Figure 3:
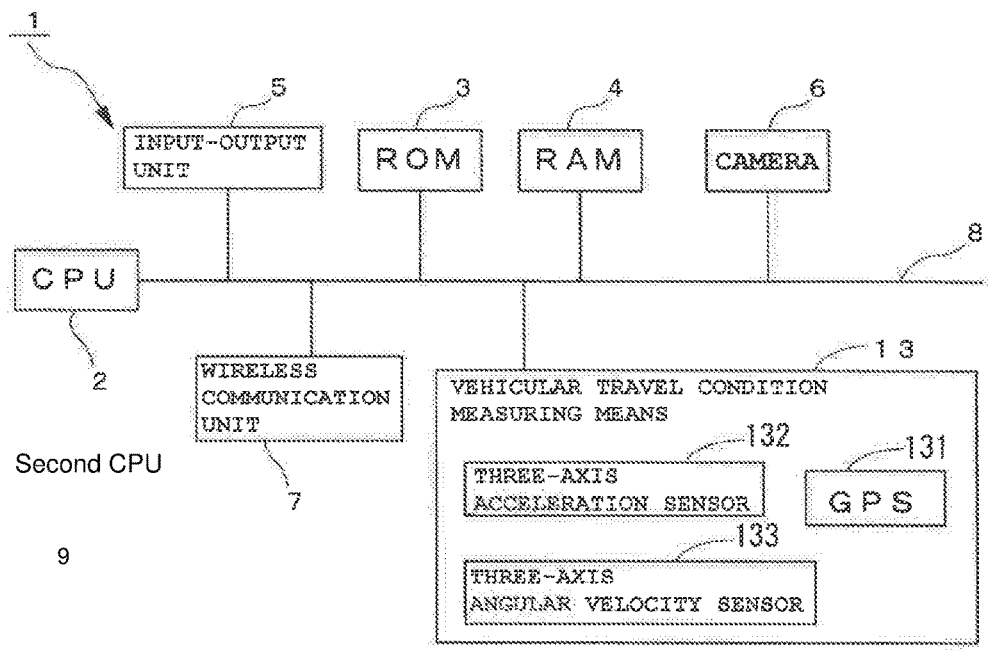
FIG. 3 is a diagram showing a configuration of a mobile terminal device according to the present invention.

As is indicated in FIG. 2, let us designate the fore-aft direction of a vehicle 50 the X-axis direction, the width (lateral) direction thereof the Y-axis direction, and the vertical direction thereof the Z-axis direction. Then the three-axis acceleration sensor 132 is a unified version of three acceleration sensors, namely, an acceleration sensor for detecting acceleration $G_X$ in the X-axis direction, an acceleration sensor for detecting acceleration $G_Y$ in the Y-axis direction, and an acceleration sensor for detecting acceleration $G_Z$ in the Z-axis direction. Thus, the three-axis acceleration sensor 132 measures the X, Y, and Z components $G_X$, $G_Y$, and $G_Z$ of the vehicular accelerations.

The three-axis angular velocity sensor 133 is a unified version of three angular velocity sensors, namely, an angular velocity sensor for measuring angular velocity $\Omega_X$ around the X-axis (roll angle velocity), an angular velocity sensor for measuring angular velocity $\Omega_Y$ around the Y-axis (pitch angle velocity), and an angular velocity sensor for measuring angular velocity $\Omega_Z$ around the Z-axis (yaw angle velocity). Thus, the three-axis angular velocity sensor 133 measures angular velocities* $\Omega_X$, $\Omega_Y$, and $\Omega_Z$ around the respective axes of the vehicle.

It is to be noted that, as will be discussed later, when the vehicular travel state monitoring device 10 is constituted by a mobile terminal device, the detection values of the three-axis acceleration sensor 132 and the three-axis angular velocity sensor 133 differ from those of the three-axis acceleration sensor 132 and the three-axis angular velocity sensor 133 which are installed at the gravitation center of the vehicle, depending on the orientation and position of installation of the mobile terminal device. Therefore, in the present implementation, the detection values are corrected by the data correcting means 14.

The data correcting means 14 converts the detection values $G_X$, $G_Y$, and $G_Z$ of the respective acceleration sensors into the accelerations $G_X$, $G_Y$, and $G_Z$ in the X-axis direction, the Y-axis direction, the Z-axis direction, respectively, when the detecting directions of the respective acceleration sensors of the three-axis acceleration sensor 132 differ from the fore-aft direction, the lateral direction, and the vertical direction of the vehicle. At the same time, the data correcting means 14 converts the detection values $\Omega_X$, $\Omega_Y$, and $\Omega_Z$ of the respective angular velocity sensors constituting the three-axis angular velocity sensor 133 around the origin, which is the position of its installation, into the angular velocities $\Omega_X$, $\Omega_Y$, and $\Omega_Z$ around the origin, which is the gravity center of the vehicle. It is to be noted that the attitude angles (roll angle, pitch angle, and yaw angle) can be calculated from the angular velocities $\Omega_X$, $\Omega_Y$, and $\Omega_Z$. The attitude angles are also subjected to a coordinate conversion in a similar manner. The detection values $G_X$, $G_Y$, and $G_Z$ of the respective acceleration sensors and the detection values $\Omega_X$, $\Omega_Y$, and $\Omega_Z$ of the respective angular velocity sensors are stored in the storage means 19 after the correction processing by the data correcting means 14. Hereinafter, the position data (X, Y, Z), the data of vehicle speed V, the acceleration data $G_X$, $G_Y$, and $G_Z$, and the angular velocity data $\Omega_X$, $\Omega_Y$, and $\Omega_Z$, which have been measured or calculated, are referred to as the measurement data.

The synthetic image specifying means 15 specifies a combination of data to be displayed on a display screen 17G of the display means 17. The combination of data is a plurality of data specified by an input (selection) of the vehicle operator, out of the measurement data measured by the vehicular travel state measuring means 13, the imaging data captured by the imaging means 12, and the Web information data acquired by the Web information acquiring unit 11a.

The synthetic image generating means 16 generates a synthetic image (moving image data) by synthesizing a plurality of data selected by the synthetic image specifying means 15 at predetermined time intervals and sends the synthetic image to the display means 17. At the same time, the synthetic image generating means 16 sends the synthetic image at the predetermined time intervals to the travel record data creating means 18.

The display means 17 displays the synthetic image generated by the synthetic image generating means 16 as a moving image on the display screen 17G.

The travel record data creating means 18 determines whether any of the components $G_X$, $G_Y$, $G_Z$ of the three-axis acceleration has exceeded the threshold value set in advance. At the same time, the travel record data creating means 18 creates a vehicle position image within a predetermined time width $\Delta T_k$ before and after time $t_k$, centered around a vehicle position image created at time $t_k$, when any of the components $G_X$, $G_Y$, $G_Z$ has exceeded the threshold value preset for time $t_k$. And the vehicle position image is stored in the storage means 19 as travel record data (moving image data).

The storage means 19 stores the measurement data measured by the vehicular travel state measuring means 13, the imaging data captured by the imaging means 12, and the Web information data acquired by the Web information acquiring unit 11a. At the same time, the storage means 19 stores, as a moving image file, the synthetic image to serve as the travel record data, out of the moving image data displayed on the display means 17. It is to be noted that the synthetic images not employed as moving image data are to be deleted after they are stored for a certain period of time or to be left in a still image file at a rate of one image in 1 to 2 minutes with the other images deleted.

In the present implementation, the vehicular travel state monitoring device 10 is constituted by a mobile terminal device 1 which incorporates a vehicular travel state measuring means 13 provided with a GPS 131, a three-axis acceleration sensor 132, and a three-axis angular velocity sensor 133.

The mobile terminal device 1 according to this implementation incorporates a CPU (central processing unit) 2, and coupled to the CPU 2 via a bus 8 are a ROM (read only memory) 3, a RAM (random access memory) 4, an input-output unit 5, a camera 6, a wireless communication unit 7, and a vehicular travel state measuring means 13. It is to be noted that when the mobile terminal device is a smartphone, the operating screen serves as the input-output unit 5.

The camera 6 is equivalent to the imaging means 12, the wireless communication unit 7 to the vehicular travel state monitoring device 10, the input-output unit 5 to the synthetic image specifying means 15 and the display means 17, and the ROM 3 and RAM 4 to the storage means 19 of the vehicular travel state monitoring device 10. Stored in the ROM 3 are various control programs for the control of the GPS 131, the three-axis acceleration sensor 132, the three-axis angular velocity sensor 133 and the imaging means 12 to be executed by the CPU 2 and arithmetic programs for operating various means, such as the data correcting means 14 and the synthetic image generating means 16. Stored in the RAM 4 are measurement data, image data, Web information, and travel record data. The CPU 2 executes the control programs and the arithmetic programs by expanding them to the RAM 4.

Figure 4A:
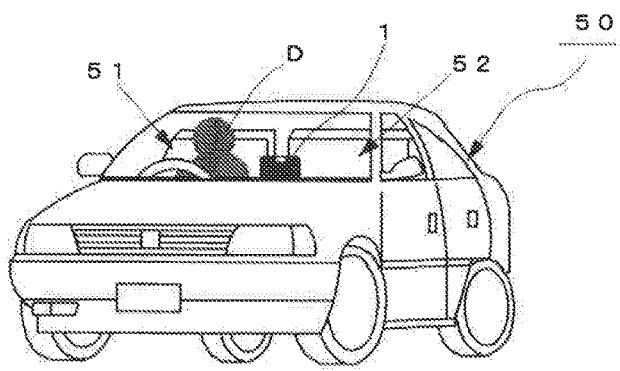
FIGS. 4A and 4B illustrate an example of installation of the mobile terminal device.
Figure 4B:
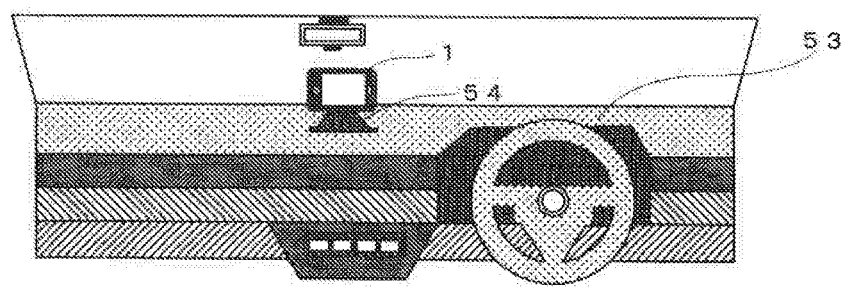

As shown in FIGS. 4A and 4B, the mobile terminal device 1 is installed on a mounting base 54 disposed on the dashboard 53 in such a manner that the imaging direction of the not-shown camera is the traveling direction of a vehicle 50 and the images captured are horizontally long on the screen.

With the mobile terminal device 1 installed on the mounting base 54, the road surface condition in the traveling direction of the vehicle 50 can be captured reliably, and the relationship between the position of the vehicular travel state measuring means 13 and the position of the center of gravity of the vehicle can be held nearly constant. Also, if the mobile terminal device 1 is installed in a position a little closer to the driver's seat 51 from the middle point between the driver's seat 51 and the front passenger seat 52, then the driver D can fully view the operating screen (input-output unit 5) which is the display screen, and the images ahead of the vehicle can be captured without obstructing the field of view of the driver D.

Figure 5:
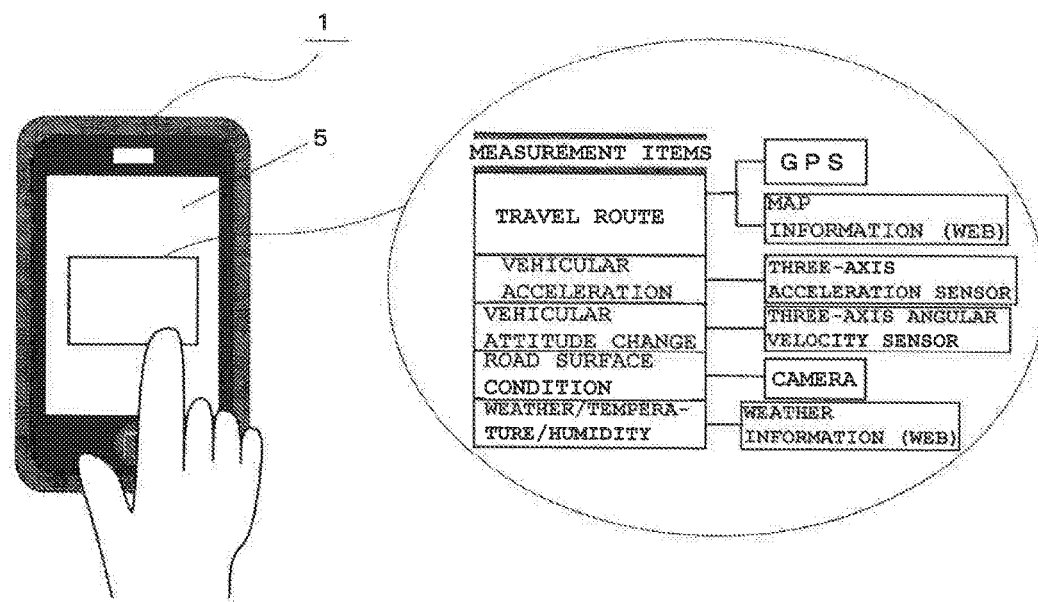
FIG. 5 is an illustration showing an example of measurement items displayed on the operating screen of the mobile terminal device.

As shown in FIG. 5, the operating screen (input-output unit 5) of the mobile terminal device 1 functions also as the synthetic image specifying means 15. That is, measurement items to be displayed on the operating screen can be specified out of the measurement items having been displayed on the operating screen by operating the operating screen (input-output unit 5) of the mobile terminal device 1. It is to be noted that the mobile terminal device 1 may be installed on the mounting base 54 after specifying the measurement items or the measurement items may be specified after installing the mobile terminal device 1 on the mounting base 54.

The vehicular travel data analyzing unit 40, which is constituted by a personal computer, for instance, analyzes the conditions of the road surface on which the vehicle travels. The vehicular travel data analyzing unit 40 includes a travel data storage means 41, a travel data analyzing means 42, and an analyzed data display means 43.

The travel data storage means 41 stores travel record data transmitted to it from a plurality of vehicles and map information on the road on which the vehicle travels.

The travel data analyzing means 42 analyzes the road surface conditions, such as the unevenness, grade, and inclination, of the road on which the vehicle travels, from a plurality of travel record data.

The analyzed data display means 43 displays the analyzed data on the road surface condition.

Figure 6:
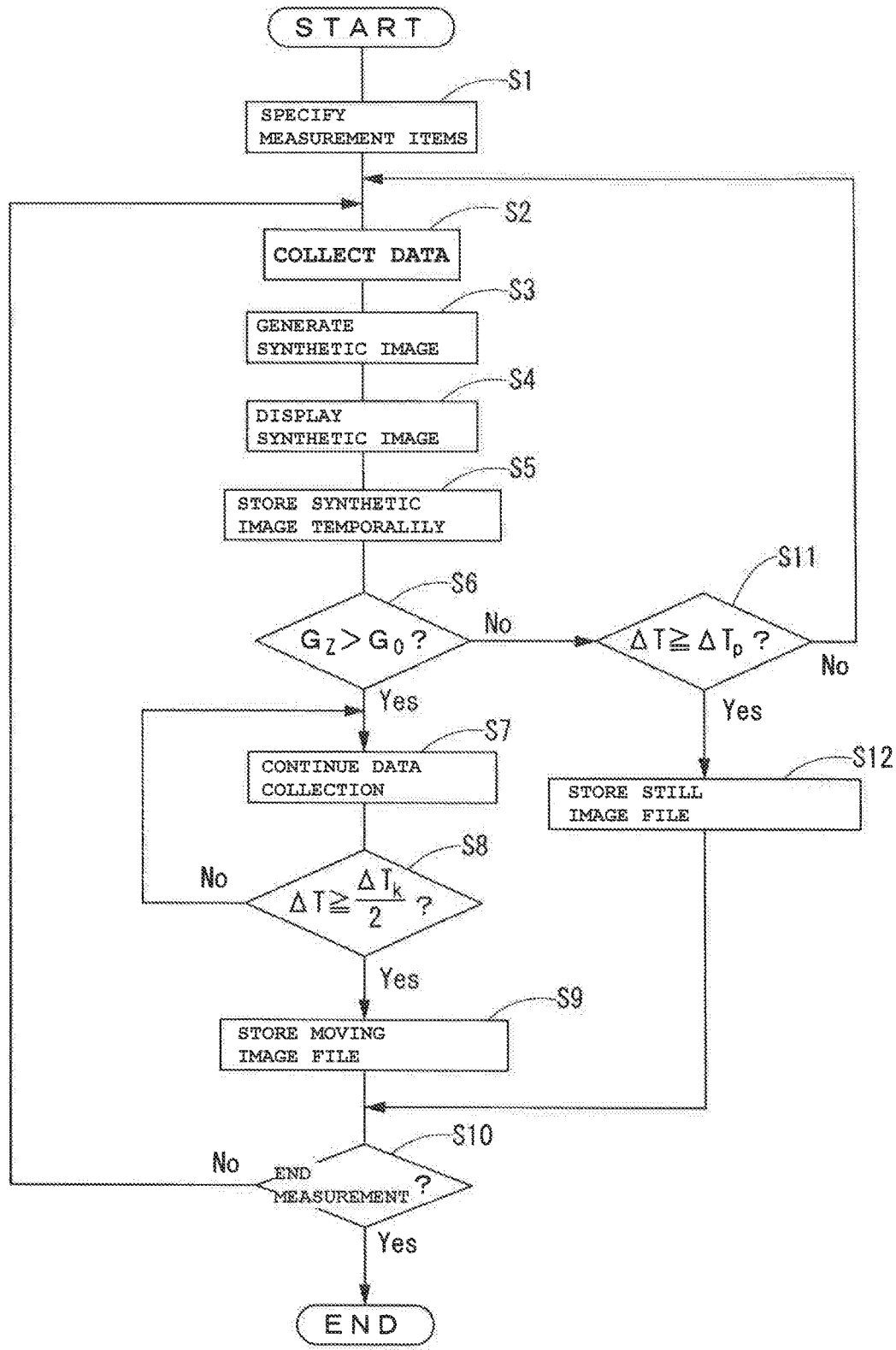
FIG. 6 is a flowchart showing the operation of the vehicular travel state monitoring system.

Now, a description is given of a method for creating travel record data using a vehicular travel state monitoring device 10 with reference to the flowchart of FIG. 6. In the present example, an explanation is given of a case where vehicle position images (moving image data) before and after when the vehicular acceleration $G_Z$ in the vertical direction (Z-axis direction) has exceeded a predetermined threshold value $G_O$ are stored as travel record data.

Firstly, the measurement items and images to be displayed on the display screen 17G are specified (step S1).

More specifically, as already mentioned, measurement items to be displayed on the operating screen are specified out of the measurement items having been displayed on the operating screen by operating the operating screen (input-output unit 5) of the mobile terminal device 1 (see FIG. 5).

The measurement items are, for example, travel route, vehicular accelerations, vehicular attitude changes, road surface condition, and weather/temperature/humidity. The travel route is generated using the vehicle position data and vehicle speed data as measured by the GPS 131 and map information acquired by the Web information acquiring unit 11a and displayed as images. The vehicular accelerations and vehicular attitude changes are obtained from the vehicular acceleration data and vehicular angular velocity data measured by the three-axis acceleration sensor 132 and the three-axis angular velocity sensor 133, respectively, and displayed as the measurement data. As road surface condition, the imaging data captured by the imaging means 12 is used in the form of images (moving image). As for weather/temperature/humidity, the weather information acquired by the Web information acquiring unit 11a is displayed as the measurement data.

In the present example, travel route, vehicular accelerations, road surface condition, and temperature are selected as the measurement items.

Next, the vehicle position data, vehicle speed data, vehicular acceleration data, imaging data, weather information, and map information are collected (step S2).

The vehicle position data, vehicle speed data, vehicular acceleration data, and imaging data are collected at predetermined time intervals. The weather information and map information may be collected at every predetermined travel kilometers. The time interval for collecting the vehicular acceleration data and imaging data may be, for instance, at every frame (e.g., 1/30 seconds) of image signals from the imaging means 12. As for vehicular acceleration data, the average value (RMS average) of 1/30 seconds may be used. Also, the collection of the vehicle position data and vehicle speed data is satisfactory if it is done at intervals of every second, for instance. Also, as for the map information, one having been stored in the storage means 19 in advance may be used.

Next, a synthetic image is generated (step S3), and the generated synthetic image is displayed on the display screen 17G (step S4).

Figure 7:
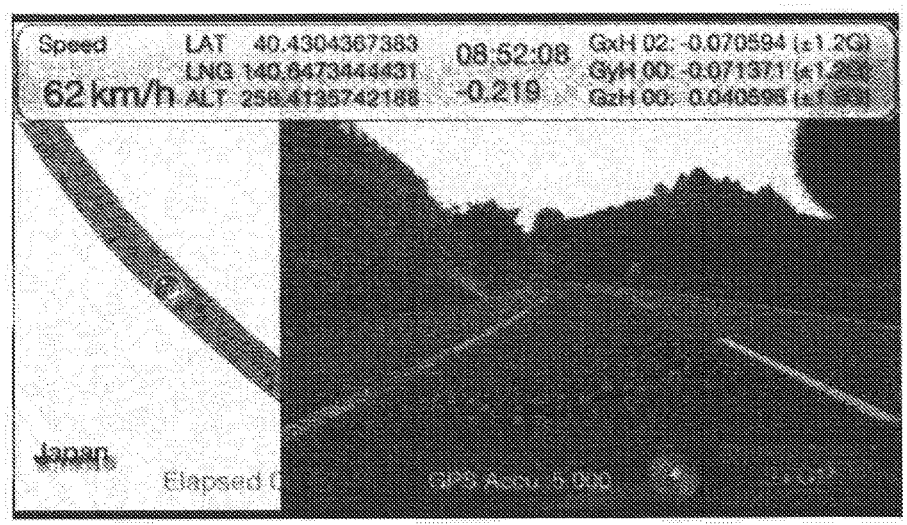
FIG. 7 is a photo showing an example of a synthetic image according to the present invention.

FIG. 7 is a photo showing one example of a synthetic image displayed on the display screen 17G.

Displayed on the upper side of the display screen 17G are the data on vehicle speed (Speed), vehicle position (LAT: latitude, LNG: longitude, ALT: altitude, time, temperature, and vehicular accelerations ($G_X$, $G_Y$, $G_X$). Displayed on the right side thereof is an image ahead of the vehicle captured by the imaging means 12. Also, displayed on the left is a map of the location where the vehicle is now running. The circle mark on the map indicates the position of the vehicle.

The synthetic images are generated at predetermined time intervals (e.g., every 1/30 seconds) and sequentially displayed on the display screen 17G. At the same time, the synthetic images are each temporarily stored for a predetermined period of time in the buffer of the storage means 19 (step S5).

Next, it is determined whether the vehicular vertical acceleration $G_Z$ has exceeded a predetermined threshold value $G_0$ or not (step S6). If the vehicular vertical acceleration $G_Z$ has exceeded the predetermined threshold value $G_0$ at time $t_k$, then data collection is continued (step S7). At the same time, it is determined whether the elapsed time $\Delta T$ from the time $t_k$ has reached $\Delta T_k/2$ or not (step S8). If $\Delta T \geq \Delta T_k/2$, the vehicle position images generated in the period from time $t_k-\Delta T_k/2$ to time $t_k+\Delta T_k/2$ are taken out of the data stored temporarily in the buffer and stored in the storage means 19 with a moving image file name, such as "travel record data; $t_k$ Uneven" to them (step S9). If the elapsed time $\Delta T$ has not reached $\Delta T_k/2$ from the time $t_k$, the procedure is returned to step S7 and data collection is continued.

After the storage of the moving image file, it is determined whether a command for the end of measurement has been issued or not (step S10). With the command for the end of measurement not having been issued, the procedure returns to step S2, and the collection of information such as vehicle position data and vehicle speed data is continued. With the command for the end of measurement having been issued, the collection of information is ended.

On the other hand, even when the vehicular vertical acceleration $G_Z$ is equal to or below the threshold value $G_0$, the synthetic images are temporarily stored in the buffer of the storage means 19. And it is determined whether the elapsed time $\Delta T$ from the time $t_k$ has elapsed a predetermined period of time $\Delta T_p$ or not (step S11). At the point when the predetermined period of time $T_p$ has elapsed, only one synthetic image generated at time $t_k+\Delta T_p$ is stored in the storage means 19 with a still image file name, such as "travel record data; $t_k$ Flat" to it, and the other images are deleted (step S12). After the storage of the still image file, the procedure goes to step S10, and it is determined whether a command for the end of measurement has been issued or not. With the command for the end of measurement not having been issued, the procedure returns to step S2. With the command for the end of measurement having been issued, the collection of information is ended. Also, when the elapsed time $\Delta T$ from the time $t_k$ is less than the predetermined period of time $\Delta T_p$, the procedure is returned to step S2 and data collection is continued.

Figure 8:
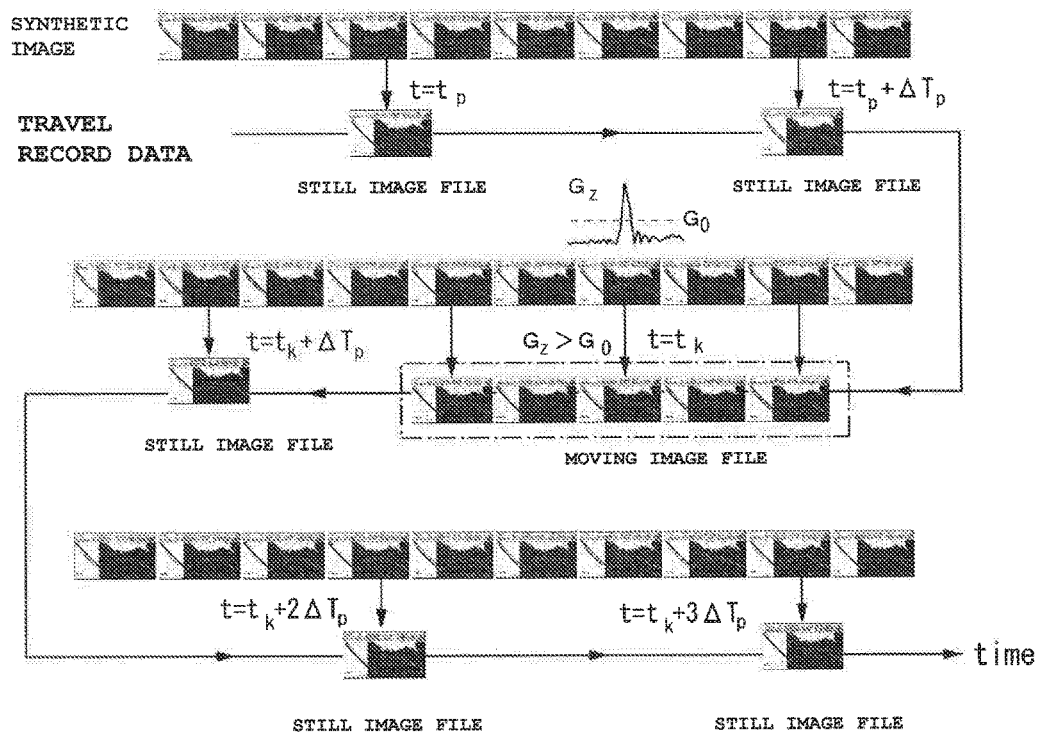
FIG. 8 is a diagram showing travel record data.

FIG. 8 is an example of a relationship between synthetic images and travel record data displayed on the display screen 17G with the arrows indicating the flow of time.

The synthetic images are moving images generated at predetermined time intervals (e.g., every 1/30 seconds), as shown in the upper row in the diagram, and sequentially displayed on the display screen 17G.

In contrast to this, the travel record data consists of still image files and moving image files.

For example, when the vehicular vertical acceleration $G_Z$ continues to be in a state of being equal to or below the threshold value $G_0$, the travel record data is constituted by still image files which are stored in the storage means 19 at time intervals of the predetermined period of time $\Delta T_p$. That is, when the vehicular vertical acceleration $G_Z$ is equal to or below the threshold value $G_0$, the travel record data is contained in a file consisting of still image files at time $t_p$, time $t_p+\Delta T_p$, time $t_p+2\Delta T_p$, . . . , arranged in a time series.

On the other hand, when the vehicular vertical acceleration $G_Z$ at time $t_k$ has exceeded the threshold value $G_0$, all the synthetic images from time $t_k-\Delta T_k/2$ to time $t_k+\Delta T_k/2$ are stored in the storage means 19 as a moving image file.

In this manner, although the synthetic images are generated at predetermined time intervals, those stored as travel record data are only still image files stored every predetermined period of time $\Delta T_p$ and a plurality of moving image files with a recording time interval of $\Delta T_k$ (about 30 seconds actually). And the other synthetic images are temporarily stored in the buffer for a predetermined period of time before they are deleted. Therefore, it is not necessary to transfer travel record data to the server 30 every time a moving image file is generated.

Figure 9A:
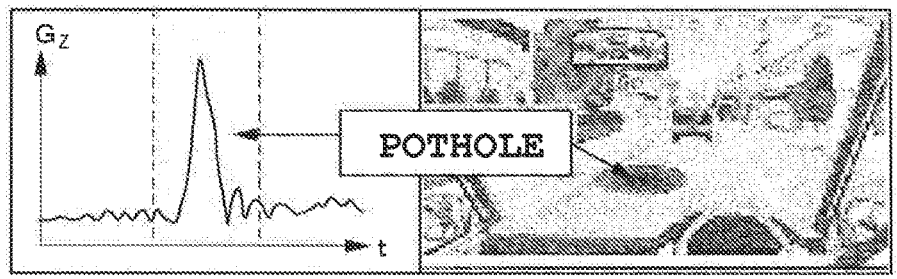
FIGS. 9A and 9B illustrate the relationship between the road surface condition and the vehicular vertical acceleration.

It is noteworthy that, as shown in FIG. 9A, when the vehicle passes over a pothole (a small hole formed in an asphalt pavement or the like), both the vehicular accelerations $G_X$, $G_Y$, $G_Z$ and angular velocities $\Omega_X$, $\Omega_Y$, $\Omega_Z$ increase, but the vehicular vertical acceleration $G_Z$ in particular changes dramatically. Accordingly, a moving image file named "travel record data; $t_k$ Uneven" may be called up from the storage means 19 and reproduced. Then it is possible to know whether the input $G_Z$ is attributable to a pothole or a level difference or the like on the road surface. It is to be noted that a more detailed road surface condition can be known by performing an analysis on the change in input $G_Z$ and imaging data using the vehicular travel data analyzing unit 40.

Figure 9B:
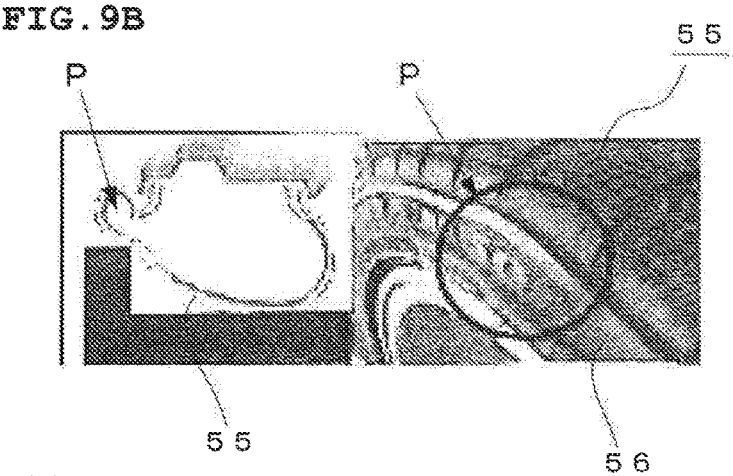

For example, when an increase in input $G_Z$ occurs repeatedly despite small unevenness or level difference of the road surface from the imaging data on the traveling direction of the vehicle, it can be estimated that a pinch cut as indicated by P in FIG. 9B has occurred. A pinch cut P is a bulge of a part of the sidewall 56 under an air pressure with the carcass cord inside the tire 55 severed. The driver does not often become aware of this trouble because this does not cause much change in the traveling state with no air escaping from the tire. Yet, this poses a great danger of a tire burst if the driver keeps driving the vehicle without correcting the situation. Also, since a pinch cut cannot be repaired, the tire must be replaced with another tire. Hence, when a flat tire caused by a pinch cut P is anticipated from the travel record data, the driver can be urged to replace the tire by sending the information of a flat tire warning from the vehicular travel data analyzing unit 40 to the mobile terminal device 1. This will improve the safety of the vehicle. In this case, a speaker incorporated in the mobile terminal device 1 can be used as an alarm unit for giving a warning to the driver.

The travel record data is transferred to the vehicular travel data analyzing unit 40 provided at the server 30 or to the vehicular travel data analyzing unit 40 connected to the vehicular travel state monitoring device 10 via the server 30 to be subjected to data analysis there.

Figure 10:
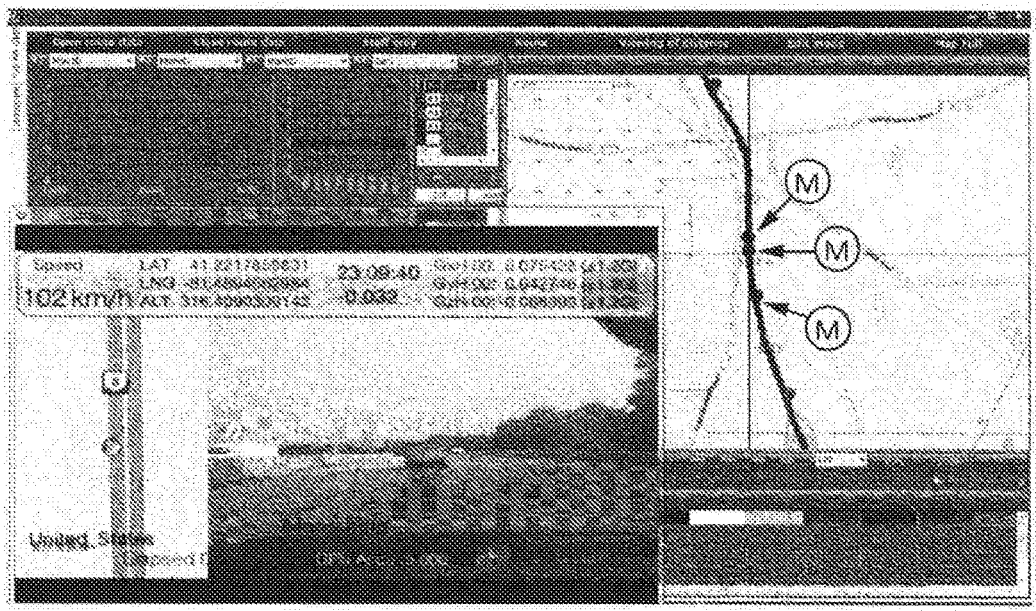
FIG. 10 is a photo showing an example of an analysis result of vehicular travel record data.

FIG. 10 shows an example of analysis of travel record data displayed on the analyzed data display means 43 of the vehicular travel data analyzing unit 40. It is a synthetic image screen transferred from the vehicular travel state monitoring device 10. The analysis results are displayed on the upper right side of FIG. 10.

In the present example, a distribution of the potholes on the road on which the vehicle has traveled has been determined by analyzing the travel record data having been transferred from the vehicular travel state monitoring device 10. As shown in the upper right section of the screen, it can be seen that the potholes are distributed in positions indicated by circled Ms on this road.

It is to be noted that the surface conditions of the road can be analyzed with better accuracy if the distribution of the potholes is determined with a plurality of vehicles running on the same road. Also, by analyzing the travel record data acquired on a number of roads, it is possible to compare the numbers of potholes on different roads. That is, for instance, **prefecture has more potholes than the others along National Route No. 1.

As described above, in the present embodiment, a mobile terminal device 1 incorporates a vehicular travel state measuring means 13 which includes a GPS 131, a three-axis acceleration sensor 132, and a three-axis angular velocity sensor 133. The mobile terminal device 1 is further provided with a synthetic image generating means 16 which generates a synthetic image of a plurality of data synthesized at predetermined time intervals, out of measurement data measured by the vehicular travel state measuring means 13, imaging data captured by an imaging means 12, and Web information data acquired by a Web information acquiring unit 11a. And the synthetic image is displayed on a display screen 17G as moving images. At the same time, the moving image data is stored in a storage means 19 as travel record data of the vehicle. Therefore, it is possible to fully grasp the traveling state of the vehicle and the road surface conditions. Also, when there is any large input from the road surface, it is possible to grasp the traveling state of the vehicle and the road surface condition quantitatively and visually.

Also, the arrangement may be such that a travel record data transfer means which transfers via the server the moving image data as the travel record data of the vehicle to a computer at a control center controlling the vehicle is further provided.

According to this arrangement, the traveling state of the vehicle can be analyzed with the road surface conditions taken into consideration by transferring via the server the travel record data to a computer at the control center controlling the vehicle. Thus, the traveling state of the vehicle and the road surface condition can be grasped with even better accuracy.

Also, another arrangement may be such that a travel record data transfer means, in the place of the storage means, which transfers via the server the moving image data as the travel record data of the vehicle to a computer at a control center controlling the vehicle is provided.

In this manner, the travel record data of the vehicle may be transferred directly, without being stored in the vehicular travel state monitoring device, to a computer at the control center controlling the vehicle, and the traveling state of the vehicle may be analyzed with the road surface conditions taken into consideration. In this arrangement, too, the traveling state of the vehicle and the road surface condition can be grasped adequately.

Also, the synthetic image generating means is so arranged as to generate, when at least one of the fore-aft acceleration, the lateral acceleration, and the vertical acceleration measured by the three-axis acceleration sensor has exceeded a threshold value set in advance, a synthetic image by synthesizing acceleration data including acceleration data in excess of the threshold value, imaging data on a view in the traveling direction of the vehicle captured by the imaging means, and image data displaying position data of the vehicle acquired by the GPS, on data of map information acquired by the Web information acquiring means or data of map information stored in the storage means in advance.

Accordingly, when there is any large input from the road surface, it is possible to grasp the traveling state of the vehicle and the road surface condition quantitatively and visually. Thus, the vehicular travel state monitoring device can be provided with a function of a drive recorder that gets started at any of the respective threshold values of the components $G_X$, $G_Y$, $G_Z$ of the three-axis acceleration sensor.

Also, it is possible that the drive recorder is started at any of the threshold values of other component data measured by the three-axis acceleration sensor or the GPS.

Also, another arrangement is such that a control means (e.g., second CPU 9) is provided for causing all the sensors to operate simultaneously by monitoring in real time and feeding back the processing capacity load and processing delay of the CPU of the vehicular travel state monitoring device.

Thus, by monitoring the processing capacity load and processing delay of the CPU of the vehicular travel state monitoring device in real time, it is possible to change the sampling rate at data measurement or change the frames of imaging according to the processing capacity. As a result, multiple sensors can be operated simultaneously.

Also, another arrangement is such that the vehicular travel state monitoring device is constituted by a mobile terminal device which includes a GPS, a three-axis acceleration sensor, and a three-axis angular velocity sensor.

In this manner, if a mobile terminal device which includes a GPS, a three-axis acceleration sensor, and a three-axis angular velocity sensor is used as the vehicular travel state monitoring device, then the whole device can be downsized. Also, if the vehicular travel state monitoring device is a mobile terminal device, it can be installed, for instance, on the dashboard before the driver's seat of the vehicle. Then the measurement of the traveling state of the vehicle and the imaging of the image ahead of the vehicle can be accomplished without obstructing the driver's field of view.

In the foregoing, the invention has been described with reference to specific embodiments thereof. However, the technical scope of this invention is not to be construed as limited to those embodiments. It will be evident to those skilled in the art that various modifications and changes may be made thereto without departing from the broader spirit and scope of the invention. It will also be evident from the scope of the appended claims that all such modifications are intended to be included within the technical scope of this invention.

For example, in the foregoing embodiment, a description has been given of a case where the vertical input $G_z$ is large. However, when the lateral input $G_y$ is frequently large, the input $G_y$ and the imaging data in the traveling direction of the vehicle may be displayed on the same screen. At the same time, travel record data may be created when the input $G_y$ has exceeded the threshold value $G_{y0}$. Then it is possible to grasp the grade and inclination of the road.

Also, the attitude angles (roll angle, pitch angle, and yaw angle) may be calculated from the components $\Omega_X$, $\Omega_Y$, $\Omega_Z$ of the three-axis angular velocity, and the road condition may be estimated from the magnitudes of the attitude angles as the travel record data (moving image data).

Also, in the foregoing embodiment, the moving image files and the still image files are stored in the storage means 19 as travel record data. However, the still image files may not be created, and the measurement data only is stored.

Also, when the vehicular vertical acceleration $G_Z$ is equal to or below the predetermined threshold value $G_0$ in step S6 of the flowchart of FIG. 6, steps S11 and S12 may be omitted and a return may be made directly to step S2.

Also, in the foregoing embodiment, the measurement items cited are the travel route, vehicular accelerations, road surface condition, and temperature. However, this is not to be a limitation, and the measurement items may be selected as appropriate from the travel route, vehicular accelerations, vehicular attitude change, road surface condition, and weather/temperature/humidity. It is to be noted that the imaging data corresponding to the road surface condition should always be included among the measurement items.

Incidentally, when there is much measurement data or arithmetic processing, the processing capacity load of the CPU may increase, thus causing a delay in processing. Therefore, when the vehicular travel state monitoring device 10 is constituted by a mobile terminal device, it is preferable to provide a control means that causes the various sensors to operate simultaneously by monitoring in real time and feeding back the processing capacity load of the CPU 2 and processing delay. Then, if the control means determines a drop in the processing capacity of the CPU 2, the control means can lower the measurement sampling rate of the vehicular travel state measuring means 13 or reduce the shutter speed (lengthen inter-frame intervals) of the imaging means 12. In this manner, the processing capacity load of the CPU 2 may be reduced, so that multiple sensors may be operated simultaneously.

It is to be noted that the processing capacity load of the CPU and processing delay can be monitored by detecting the temperature rise of the CPU or detecting the delay in the processing time of recording of travel record data.

DESCRIPTION OF REFERENCE NUMERALS 1 mobile terminal device
2 CPU
3 ROM
4 RAM
5 input-output unit
6 camera
7 wireless communication unit
8 bus
10 vehicular travel state monitoring device
11 communication means
12 imaging means
13 vehicular travel state measuring means
131 GPS
132 three-axis acceleration sensor
133 three-axis angular velocity sensor
14 data correcting means
15 synthetic image specifying means
16 synthetic image generating means
17 display means
17G display screen
18 travel record data creating means
19 storage means
20 Internet
30 server
40 vehicle travel data analyzing unit
41 travel data storage means
42 travel data analyzing means
43 analyzed data display means
100 vehicular travel state monitoring system

The invention claimed is:

1. A vehicular travel state monitoring device mounted on a vehicle to monitor a traveling state of the vehicle, the device comprising:
   a Web information acquiring means for acquiring Web information via an external network;
   an imaging means for capturing images of outside or inside of the vehicle;
   a vehicular travel state measuring means including a GPS, a three-axis acceleration sensor, and a three-axis angular velocity sensor;
   a synthetic image generating means for generating a synthetic image by synthesizing a plurality of data at predetermined time intervals, using at least measurement data measured by the vehicular travel state measuring means, imaging data captured by the imaging means, and Web information data acquired by the Web information acquiring means;
   a display means for displaying the synthetic image synthesized by the synthetic image generating means as a moving image;
   a storage means for storing data of the moving image as travel record data of the vehicle; and
   a control means to control all the sensors to operate simultaneously, the controlling based on a processing capacity load and a processing delay, in real time, of a CPU of the vehicular travel state monitoring device.

2. The vehicular travel state monitoring device according to claim 1, further comprising a travel record data transferring means for transferring, via a server, the travel record data to a computer at a control center, wherein the control center is configured to send at least one command to the vehicle to control the vehicle.

3. A vehicular travel state monitoring device mounted on a vehicle to monitor a traveling state of the vehicle, the device comprising:
   a Web information acquiring means for acquiring Web information via an external network;
   an imaging means for capturing images of outside or inside of the vehicle;
   a vehicular travel state measuring means including a GPS, a three-axis acceleration sensor, and a three-axis angular velocity sensor;
   a synthetic image generating means for generating a synthetic image by synthesizing a plurality of data at predetermined time intervals, using at least measurement data measured by the vehicular travel state measuring means, imaging data captured by the imaging means, and Web information data acquired by the Web information acquiring means;
   a display means for displaying the synthetic image synthesized by the synthetic image generating means as a moving image;
   a control means to control all the sensors to operate simultaneously, the controlling based on a processing capacity load and a processing delay, in real time, of a CPU of the vehicular travel state monitoring device; and
   a travel record data transferring means for transferring, via a server, data of the moving image as travel record data of the vehicle to a computer at a control center, wherein the control center is configured to send at least one command to the vehicle to control the vehicle.

4. The vehicular travel state monitoring device according to claim 1, wherein the synthetic image generating means generates, when at least one of a fore-aft acceleration, a lateral acceleration, and a vertical acceleration measured by the three-axis acceleration sensor has exceeded a threshold value set in advance, a synthetic image by synthesizing acceleration data including acceleration data in excess of the threshold value, imaging data on a view in the traveling direction of the vehicle captured by the imaging means, and image data displaying position data of the vehicle acquired by the GPS, on data of map information acquired by the Web information acquiring means or on data of map information stored in the storage means in advance.

5. The vehicular travel state monitoring device according to claim 1, wherein the vehicular travel state monitoring device is configured by a mobile terminal device having a GPS, a three-axis acceleration sensor and a three-axis angular velocity sensor built therein.

6. A system for controlling the travelling state of a vehicle, the system comprising:
- a vehicular travel state monitoring device mounted on a vehicle to monitor a traveling state of the vehicle, the device including:
  - a Web information acquiring means for acquiring Web information via an external network,
  - an imaging means for capturing images of outside or inside of the vehicle,
  - a vehicular travel state measuring means including a GPS, a three-axis acceleration sensor, and a three-axis angular velocity sensor,
  - a synthetic image generating means for generating a synthetic image by synthesizing a plurality of data at predetermined time intervals, using at least measurement data measured by the vehicular travel state measuring means, imaging data captured by the imaging means, and Web information data acquired by the Web information acquiring means,
  - a display means for displaying the synthetic image synthesized by the synthetic image generating means as a moving image,
  - a storage means for storing data of the moving image as travel record data of the vehicle, and
  - a control means to control all the sensors to operate simultaneously, the controlling based on a processing capacity load and a processing delay, in real time, of a CPU of the vehicular travel state monitoring device; and
- a remote controller configured to receive data from the vehicular travel state monitoring device and transmit instructions to the vehicle to control the vehicle based on the data.

* * * * *